Oct. 10, 1939.    J. S. BAKER    2,175,373
METHOD OF SEALING PRESSURE VESSELS AGAINST LEAKS
Filed April 23, 1937
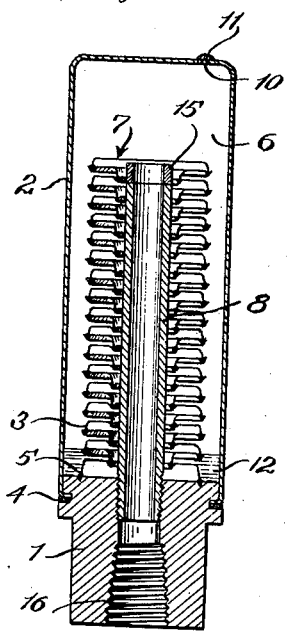
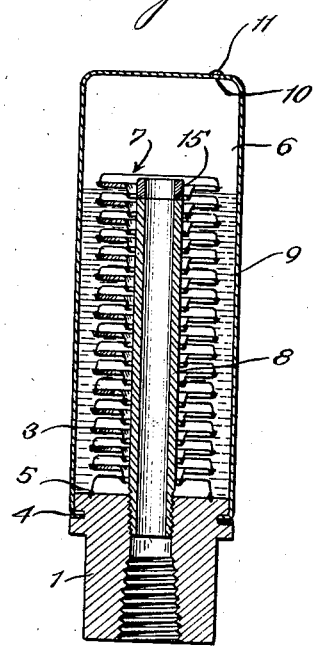
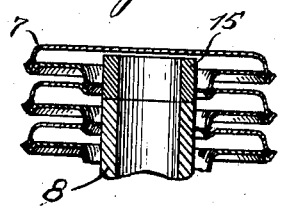

Patented Oct. 10, 1939

2,175,373

UNITED STATES PATENT OFFICE 2,175,373

METHOD OF SEALING PRESSURE VESSELS AGAINST LEAKS

John S. Baker, Chicago, Ill., assignor to Cook Electric Company, Chicago, Ill., a corporation of Illinois Application April 23, 1937, Serial No. 138,600

1 Claim. (Cl. 91—68)

The present invention relates to improvements in pressure vessels, and more particularly to an improved method of sealing vessels of this type against minute leaks, due to porosity or the like, that are difficult of detection.

Certain types of pressure vessels are employed under conditions requiring an absolute leak-proof construction if they are to be practical and commercially useful. A pertinent example is an expansible and contractible vessel used as a vapor motor or as an impact arrester wherein relatively high pressures are developed during the working stroke and a liquid is employed that may, either in a vapor state or in its liquid state, be forced in minute amounts through pores or other small openings in the walls. Leakage of this kind is difficult of detection and may be so minute that it will fail to appear during a test. However, over a period of time, the loss of pressure, as the result of a loss of liquid or gas, will reduce the working range of the vessel and affect the stroke to a point of rendering the device impractical and of little commercial value.

Impact arresters are usually employed under conditions and in locations where the operation is unnoticeable, while vapor motors are usually employed where failure of operation, especially if gradual by undetectable minute losses of pressure, will affect other operations dependent upon the vapor motor, which might cause serious damage before noticed.

Accordingly, it is an object of this invention to provide an improved and novel method for sealing pressure vessels against minute leaks, due to such causes as porosity of the walls or the like, which are difficult of detection and will show their effects only after the device has been installed and in operation for a period of time.

More specifically, the present invention relates to a step in the construction of a vessel of this type which will assure positive sealing of any and all porous openings or such minute openings that permit losses of pressure difficult to detect, and particularly those openings which are so minute that leakage therethrough usually does not occur until high internal pressures obtain in the vessel.

According to the specific teachings of this invention, the vessel is charged with a sealing liquid and gas under pressure, and is then sealed. The vessel is thereafter agitated or tumbled, so that the sealing liquid is forced to travel over the inner surface of the walls. Wherever a porous condition exists, or minute openings permitting leakage usually under pressure only appear, the sealing liquid is forced into these pores or minute openings and solidifies, thereby effectively sealing the wall against any and all leaks.

This method of sealing vessels of this type may be adapted as an intermediate or as a final step in the construction.

Other objects and advantages of the invention will be apparent from the following detailed description when taken in connection with the accompanying drawing forming a part thereof.

In the drawing:

Figure 1 is an illustration of one type of pressure vessel that may be treated by the method herein disclosed for sealing against minute or porous-like openings in the walls;

Fig. 2 illustrates this type of pressure vessel when finally constructed; and

Fig. 3 is a detail sectional view of a portion of the inner wall of this type of pressure vessel.

For the purposes of illustration, I have shown a single adaptation of the invention to a pressure vessel. It is to be understood at the outset that this adaptation is merely illustrative of the invention disclosed so that those skilled in the art will be readily taught how to practice the invention.

It will also be understood that although I have shown only one type of pressure vessel, those skilled in the art will be taught from this illustration how to apply the invention to other types of pressure vessels. Not only may the invention be applied to any type of pressure vessel producing a working stroke that should preferably be kept constant, but it may be used in connection with pressure vessels designed to maintain predetermined pressures therein.

The device illustrated broadly in the drawing comprises a base 1, an outer shell 2, and an inner expansible and contractible wall 3. Outer shell 2 and inner expansible and contractible wall 3 are hermetically sealed at 4 and 5 respectively to base 1 to provide a sealed chamber 6. The upper end of expansible and contractible wall 3 may be closed by a cap 7.

Inasmuch as the device shown in the drawing is an impact arrester of the type disclosed in my copending application, Serial No. 93,221 and filed July 29, 1936, body 1 is provided with a central threaded opening 16 for receiving the connection attaching the impact arrester to a liquid system. The interior of the expansible and contractible wall 3 is placed in communication with the liquid system through pipe 8 extending upwardly into this wall and terminating slightly below plate 7. The device in completed form and ready for operation is illustrated in Fig. 2. A predetermined quantity of liquid 9 is introduced into chamber 6 through port 10 that is finally sealed at 11. Gas under pressure is introduced above liquid 9. Liquid 9 acting as a yieldable body permits expansion of flexible wall 3 within its safe working limit. In the average dwelling or home, water is generally supplied at a pressure of about 45 pounds per square inch. The hammer or pounding action occurring upon the closing of the faucet or valve in the system is the result of a pressure wave that moves backwardly through the system when the flow of the water column is suddenly arrested. Theoretically, it is said that this pressure wave travels backwardly through the system at the rate of approximately 4400 feet per second, and, with a normal water pressure of 45 pounds per square inch in the system, it may increase to a pressure of over 400 pounds per square inch. The rapid rise in pressure necessitates the quick absorption of energy to prevent the occurrence of a hammer action. This absorption is effected through the expansion of flexible wall 3 and the compression of air above liquid 9 to produce an internal pressure balancing the pressure wave. It will be observed, therefore, that this type of vessel is subjected to high pressures which must be maintained. Liquid 9 serves to limit the amount of air that need be placed in chamber 6 to produce this internal pressure capable of balancing the external pressure wave. A flexible wall of the type illustrated at 3 may expand not more than 25% of its length before reaching the limit of elasticity of the metal wall. It will be observed, therefore, that it is essential that leakage of liquid 9 or the air thereabove in chamber 6 be prevented, if this impact arrester is to function properly by absorbing the increased energy through producing an internal pressure balancing the external pressure wave. Due to high pressures, a porous condition of the wall or a minute leak in the wall will cause loss of this liquid 9 or air. Water hammers or impact arresters are employed in locations that are usually not visible, and are often forgotten after installed. The peculiarity of their adaptation makes it necessary, therefore, that they function properly over a long period of time.

To eliminate a porous condition in the wall of the vessel that is difficult to detect even though the vessel is subjected to careful tests, and also such other minute leaks that are likewise difficult to detect and will only show their effects after the device has been installed and used for some time, I propose to insert before liquid 9 and air are placed in chamber 6 and the chamber is sealed, a small quantity of sealing liquid designated 12 in Fig. 1, and thereafter, to place chamber 6 under a predetermined pressure, say by injecting a gas under pressure through port 10 and temporarily sealing port 10 as indicated at 11. The device is then agitated or shaken, so that sealing liquid 12 will flow over the entire inner surface of both walls 2 and 3.

The pressure of the gas that is injected into chamber 6 may be sufficiently high under given conditions to force the sealing liquid 12 into any pores or small minute openings in these walls 2 and 3. I propose to employ any suitable sealing mediums, and mention lacquer or shellac as being satisfactory sealing mediums under certain conditions of use.

It will be understood that the present invention is also directed to a method of employing a sealing liquid that will solidify when coming into contact with air. Consequently, I propose employing a gas that will not affect this sealing liquid so that when it is injected into chamber 6 it will only serve the purpose of forcing the sealing liquid into any pores or minute openings in walls 2 and 3. As the sealing liquid is forced into these pores or minute openings, it will gradually come into contact with the air outside the vessel and solidify in the porous or minute openings.

However, this is not essential to the more specific aspects of the present invention because any type of sealing liquid may be used which may merely form a coating over the inner surface of walls 2 and 3. But, I prefer to employ a gas of a pressure that will tend to force the sealing liquid 12 into pores or minute openings in the walls 2 and 3, so as to assure a tight and perfect seal of these openings by means of this liquid. Forcing sealing liquid 12 into any pores or minute openings in walls 2 or 3 appears to cause a more efficient sealing action, due to the fact that a more perfect bonding action in the sealing between liquid 12 and walls 2 and 3 is secured.

After the vessel is sufficiently agitated or tumbled to cause sealing liquid 12 to form a film or coating over the inner surfaces of walls 2 and 3, seal 11 is broken and any remaining sealing liquid 12 is removed.

In the type of pressure vessel illustrated herein and shown complete in Fig. 2, liquid 9 and gas under pressure may thereafter be injected and the vessel sealed.

As I have previously explained, impact arresters used in a liquid system are subjected to high pressures. These high pressures are rapidly created and must be rapidly absorbed. Quite often upon the release of pressure in the system, top plate 7 will be brought rapidly back to its original position. To eliminate injury to plate 7 that might be caused by its striking the tip of pipe 8, a resilient or semi-resilient abutment 15 is formed at the tip of pipe 8.

From the foregoing description it is apparent that the method of and means for sealing walls of pressure vessels against porous or minute openings may be applied to any type of pressure vessel and is not limited to the type herein illustrated. I prefer to adopt as an illustration an embodiment of the invention the type of pressure vessel shown herein in order to show the advantages accruing from use of the invention.

I do not wish to be limited to the kind of sealing liquid employed, nor do I wish to be limited to the manner in which the sealing liquid forms a protective seal where porous or minute openings exist in the walls of the vessel. As previously mentioned, sealing liquid 12 may be employed to form only a coating over the inner surface of the vessel wall and need not be used, therefore, in connection with a gas under pressure that will force this sealing liquid into porous or minute openings. In this event, there will be an inner coating formed about the entire interior of the vessel.

Without further elaboration, the foregoing will so fully explain the gist of my invention that others, by applying current knowledge, may readily adopt the same for use under varying conditions of service without eliminating certain features which may properly be said to constitute the essential items of novelty involved, which items are intended to be defined and secured to me by the following claim.

I claim:

The method of sealing porous or like minute openings in a pressure vessel having a contractible and expansible wall adapted to have its operating movement affected by the internal pressure in the vessel which comprises injecting a liquid into said vessel that will form a solidified mass when exposed to atmosphere, also injecting into said vessel a gas under pressure that will not cause solidification of said liquid, thereafter causing said liquid to flow over the inner surface of said vessel and to be forced into any porous or like minute openings in the vessel's wall by the pressure of said gas, and effecting solidification of the liquid in said porous or like minute openings by continuing to force said liquid through said openings until the liquid reaches the exterior surface of said wall and is exposed to the atmosphere.

JOHN S. BAKER.